Figure 1:
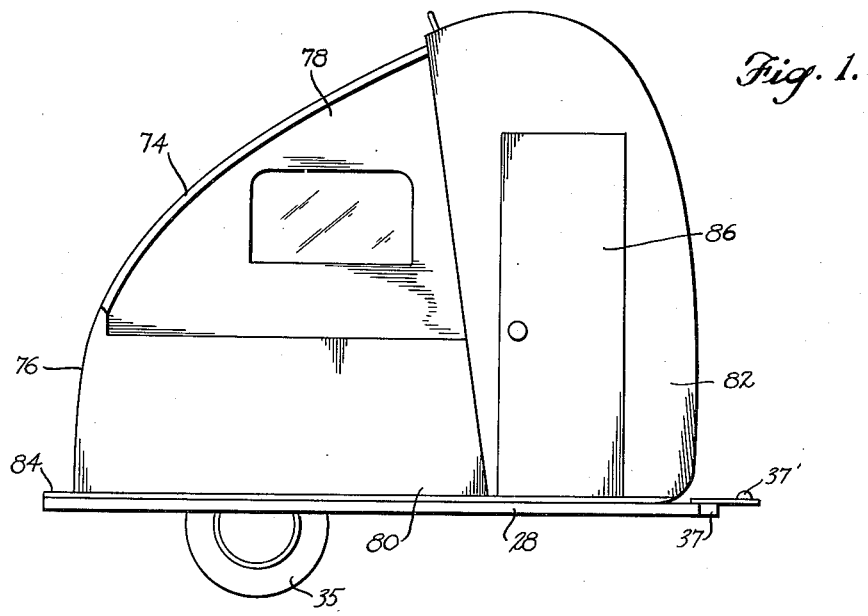

Sept. 11, 1951 M. R. JONES 2,567,516
MOBILE COLLAPSIBLE LIVING UNIT
Filed Aug. 1, 1947

INVENTOR.
MEREDITH R. JONES
BY
Reynolds & Beach
ATTORNEYS

Patented Sept. 11, 1951

2,567,516

UNITED STATES PATENT OFFICE 2,567,516

MOBILE COLLAPSIBLE LIVING UNIT

Meredith R. Jones, Port Orchard, Wash.

Application August 1, 1947, Serial No. 765,325

2 Claims. (Cl. 296—23)

This invention relates to trailers or cabins for automotive vehicles and the like, and especially to those of the collapsible or folding type which can be arranged compactly for travelling and can be erected conveniently into comfortable and relatively spacious living quarters when desired. A principal object of the invention generally is to provide an improved trailer of this type which can be expanded and collapsed very quickly with relative ease.

In general, collapsible trailers have a number of advantages which suit them well for camping trips or travelling excursions. When arranged for travelling, their reduced volume or size and lightweight construction, relative to the so-called "house" trailer which is not collapsible, simplifies towing by locating the center of gravity substantially over the point of wheel support in the case of a two wheel trailer, adds to their stability and maneuverability on the road by reducing head wind resistance area, as well as decreasing the severity of side wind loads, and gives the automobile operator better visibility through the rear vision mirror of his automobile. Moreover, their weight relative to that of a house trailer of the same capacity, may be small since, for example, the wall and roof sections of the collapsible trailer need not be constructed to stand the vibration and stress to which the corresponding sections of a house trailer are subjected, while at the same time they are of substantial construction.

Heretofore, however, collapsible trailers, assuming various forms, had certain limitations and difficulties some of which I shall now describe briefly. For example, in many of these trailers, the living compartment was formed of canvas, like a tent erected over a floor platform. While of lightweight construction and compact when collapsed, disadvantages common to these trailers, in addition to their flimsy construction and dubious protection from the elements, resided in the complexity and inconvenience of erecting and folding away the cover. Moreover, if the trailer was rained upon while erected, it was necessary either to allow time for the canvas to dry or to fold it away while wet, requiring erecting the trailer at a later time to allow the canvas to dry to avoid rotting or mildewing. On the other hand, many of the earlier collapsible trailers which were of the panel or rigid type, ordinarily not requiring canvas in their construction, were either bulky and complex in construction or provided a relatively small increase in living space when erected.

The present invention is concerned with an improved trailer, or the like, of compact, lightweight construction and capable of handling with comparative ease. An object is to provide such a trailer or mobile living compartment affording a living space which is large relative to its compacted or collapsed volume or bulk, the trailer involving a minimum number of parts requiring manipulation to erect and collapse the living quarters.

While the invention is thought to be particularly suited to trailers of a size for approximately two persons, it will be evident that it is by no means limited to such capacity.

The principal feature of the invention comprises, in a collapsible mobile cabin or living unit having multiple compartmenting portions or sections, a swingable outer shell or cover of obtuse angle formation, which may be raised or lowered for erecting and collapsing the trailer, respectively. The cover is lowered for travelling, surrounding and covering the other parts of the living unit which are then compactly arranged within it, and presenting a neat and compact outward appearance. When thus collapsed the overall height of a trailer, for example, is considerably less than it is when the trailer is erected, reducing air drag and affording convenient rearward visibility to the operator of the towing vehicle. When erected, the rear wall of the cover is met by a swinging roof panel, hinged by its lower end to a rear wall of the trailer box, thereby forming a cabin roof.

In the erected position of the unit the front wall of the cover becomes an additional section of floor. The remaining compartmenting portion of the trailer when erected is complemental to the cover portion to complete the living quarters.

Alternatively, the invention may be applied to trucks or other vehicles if desired, as will be evident. Moreover, various optional forms of construction are possible incorporating such a swinging cover.

The foregoing and other features and aspects of the invention will become more fully apparent from the following description of representative embodiments, based upon the accompanying drawings.

Figure 2:
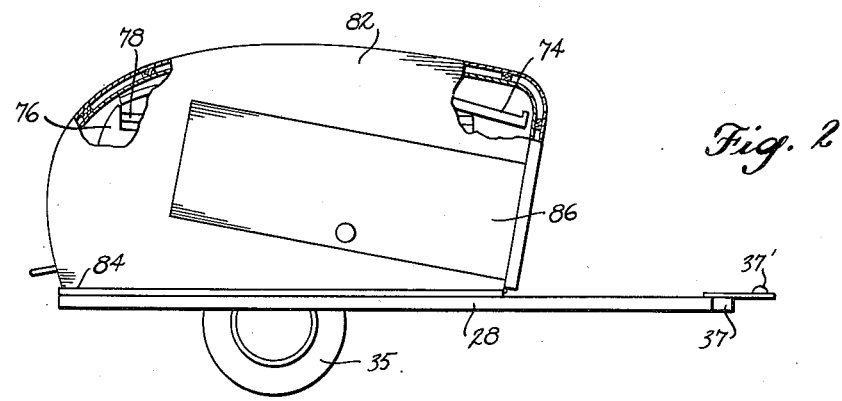

Figures 1 and 2 are side elevation views showing the improved trailer in erected and collapsed condition, respectively.

The trailer carriage may include any suitable base structure or chassis. In its illustrated form, the carriage includes longitudinal, laterally spaced channel beams 28 suitably connected together transversely by cross beams in conventional or obvious manner, supported by a suitable undercarriage, such as a conventional double-spring structure connected to a wheel and axle assembly having wheels 35. The structure by which the trailer is drawn includes a forwardly extending tongue 37 having at its front end a suitable trailer hitch 37' engageable with a complemental element mounted on the rear end of the drawing vehicle (not shown). The tongue is formed by an extension of a channel beam 28. Preferably this tongue is long enough to provide the necessary space or clearance for receiving the forward end of the cover 82 in raised position resting on it between the fixed, rearward portions of the trailer body and the trailer hitch 37'.

While ordinarily unnecessary to do so, a telescoping or folding tongue could be provided to reduce the length of the trailer when travelling, the tongue being extended when the trailer is to be erected, without requiring it to be disconnected from the drawing vehicle. If desired, the tongue may also be equipped with retractable jack means (not shown) in a well known manner for leveling and supporting the trailer when it is disconnected from the towing vehicle. As is common to equip trailers with such jacks, the present illustration does not include it.

The roof of the trailer is formed of the rear wall of the swinging cover 82 and of a single panel 74 pivotally connected to the upper edge of the rear wall 76. The length of this roof panel is such that when it is lowered into position resting on the folded upper side wall panels 78, which latter are pivotally connected to the upper edges of lower side panels 80, it is then received in the lowered cover 82, as in Figure 2. Consequently, it does not interfere with full closing of cover 82. When in raised position, however, as in Figure 1, the swinging end of the roof section 74 is met directly by the lip or edge of the cover's rear wall. To effect such disposition of the edge of the cover's rear wall, the edges of its side panels form an obtuse angle with its front wall, so that they slope rearwardly and upwardly when the cover is erected. The forward edges of upper side panels 78, when raised, are sloped back to the swinging edge of the raised roof section, and join the correspondingly rearwardly inclined side edges of the raised cover.

Thus, when the cover is closed, with its lip resting horizontally on ledge 84, its forward wall, forming the floor panel of the cover when raised, assumes a position inclined upwardly and forwardly with respect to the vertical. This conformation also gives greater clearance for the forwardly projecting end of roof section 74 so that its length may be as great as possible. Door 86, which is vertical when the cover is raised, assumes a downwardly and forwardly sloping position with the cover closed, as shown in Figure 2. The construction of the trailer will be seen to involve a minimum number of parts requiring handling or positioning in erecting and collapsing the trailer. The parts are all readily accessible in turn for manipulation, and the height of the trailer when collapsed is a minimum, thereby affording good road stability and low wind resistance.

It is worthy of note that the trailer when in collapsed position, such as shown in Figure 2, is substantially balanced about the axle of wheels 35, thereby minimizing strain on the drawing vehicle and trailer hitch, whereas when the trailer cabin is erected, as shown in Figure 1 the larger part of the load is located forward of the axle to be shared by the towing vehicle or tongue jack. Such shift of the center of gravity of the trailer cabin a substantial distance forward of the axle has the advantage that a supporting jack, if one is used to lend stability to the trailer when erected and disconnected from the drawing vehicle, will be required beneath the tongue only and none will be necessary under the rear of the trailer.

In general, either aluminum, plywood, plastic or other light weight paneling constructions are applicable. It will be evident, of course, that the particular structural details of the paneling, connectors, joints, mode of hinging, etc. are all subject to variation and, for the most part, their particular forms do not constitute features of my invention. Similarly, while outer surface curvatures or contours generally like those shown are preferred, they are only illustrative, and the invention is not limited except as stated in the appended claims.

I claim as my invention:

1. A trailer for an automotive vehicle comprising a supporting frame and a foldable cabin mounted on said frame, said cabin comprising a generally rectangular compartment having a floor, fixed side walls and a rearward end wall, movable side wall panels hingedly connected to the upper edges of said side walls for swinging upward into vertically projected position, a roof panel hingedly connected at one edge to the upper edge of said rearward end wall for swinging into upraised position to form a cover for said rectangular compartment, and an open shell adapted to cover and surround said rectangular compartment in the lowered position of said shell, means hingedly connecting the lower forward edge of said lowered shell to the lower forward edge of said compartment for swinging of said shell into upraised position in which it defines an end compartment opening into the first said compartment, with the forward wall of said shell defining a floor extension of said generally rectangular compartment, the rearward wall of said shell defining a substantial continuation of said roof panel in raised position, and the side walls of said shell defining substantial continuations of said rectangular compartment's fixed side walls and associated movable side wall panels in raised position, respectively, the forward wall of said shell and the lower edges of the side walls of said shell defining an obtuse angle substantially greater than 90 degrees, a tongue extension projecting forwardly from the frame and adapted to support the shell in raised position with the forward wall thereof resting on said tongue extension, and a door and doorway mounted in a side wall of the shell and extending generally lengthwise between the forward and rearward walls thereof, the bottom edge of said door lying substantially parallel to the plane of the forward wall of the shell.

2. A trailer for an automotive vehicle comprising a supporting frame and a foldable cabin mounted on said frame, said cabin comprising a generally rectangular compartment having a floor, fixed side walls and a rearward end wall, movable side wall panels hingedly connected to the upper edges of said side walls for swinging upward into vertically projected position, a roof panel hingedly connected at one edge to the upper edge of said rearward end wall for swinging into upraised position to form a cover for said rectangular compartment, and an open shell adapted to cover and surround said rectangular compartment in the lowered position of said shell, means hingedly connecting the lower forward edge of said lowered shell to the lower forward edge of said compartment for swinging of said shell into upraised position in which it defines an end compartment opening into the first said compartment, with the forward wall of said shell defining a floor extension of said generally rectangular compartment, the rearward wall of said shell defining a substantial continuation of said roof panel in raised position, and the side walls of said shell defining substantial continuations of said rectangular compartment's fixed side walls and associated movable side wall panels in raised position, respectively, the forward wall of said shell and the lower edges of the side walls of said shell defining an obtuse angle substantially greater than 90 degrees, a tongue extension projecting forwardly from the frame and adapted to support the shell in raised position with the forward wall thereof resting on said tongue extension, and a door and doorway mounted in a wall of said shell.

MEREDITH R. JONES.

REFERENCES CITED

The following references are of record in the file of this patent:

UNITED STATES PATENTS

| Number | Name | Date |
|---|---|---|
| 2,071,489 | Alvord | Feb. 23, 1937 |
| 2,154,365 | Taylor | Apr. 11, 1939 |
| 2,188,545 | Smelker | Jan. 30, 1940 |
| 2,225,993 | Hornberger | Dec. 24, 1940 |

FOREIGN PATENTS

| Number | Country | Date |
|---|---|---|
| 11,395 | Australia | Dec. 19, 1928 |
| 390,599 | Great Britain | Apr. 13, 1933 |
| 633,648 | France | Mar. 4, 1939 |
| 829,613 | France | Apr. 5, 1938 |